United States Patent [19]
Mullins

[11] Patent Number: 4,801,058
[45] Date of Patent: Jan. 31, 1989

[54] AIRCRAFT AND POWERPLANT COMBINATIONS

[75] Inventor: John A. Mullins, Glastonbury, Conn.

[73] Assignee: Rolls-Royce plc, London, England

[21] Appl. No.: 11,215.

[22] Filed: Feb. 5, 1987

[51] Int. Cl.[4] ............................................. B64D 29/02
[52] U.S. Cl. ...................................... 244/55; 244/54
[58] Field of Search ........................... 244/54, 55, 130

[56] References Cited

U.S. PATENT DOCUMENTS

| 3,031,157 | 4/1962 | Vanden | 244/54 |
|---|---|---|---|
| 3,229,933 | 1/1966 | Kutney | 244/55 |
| 4,318,516 | 3/1982 | Cole | 244/55 |

FOREIGN PATENT DOCUMENTS 1069781  5/1967  United Kingdom .

Primary Examiner—Joseph F. Peters, Jr.
Assistant Examiner—Rodney Corl
Attorney, Agent, or Firm—Cushman, Darby & Cushman

[57] ABSTRACT

An aircraft has a ducted fan gas turbine engine connected thereto by an underwing mounting arrangement. Links connect the engine to wing main beams and are connected only to that side of the engine which is inboard with respect to the fuselage of the aircraft. An aerodynamically shaped box structure surrounds the links and obviates the gap between engine and wing on the inboard side of the engine.

3 Claims, 2 Drawing Sheets

AIRCRAFT AND POWERPLANT COMBINATIONS

This invention concerns the mounting of a fluid flow powerplant on an aircraft.

It is the accepted practice to connect a fluid flow powerplant via a pylon, to the underside of an aircraft wing. Moreover, it is the accepted practice, to position the pylon at top dead centre of the powerplant, in alignment with the longitudinal axis thereof.

Virtually all aircraft which have such powerplants mounted thereon in the manner mentioned hereinbefore, also share a common wing plan i.e. the wings are swept backwards. The design has many advantages but also a disadvantage, and that is the airflow tends to veer from the leading edges of the wings and spread spanwise thereof, away from the aircraft fuselage, rather than flowing entirely chordwise. There results a piling up of air against the inboard side of the pylon, in the narrow space between the wing undersurface and the top of the powerplant cowl. By inboard is meant that side surface of the pylon which is nearest the aircraft fuselage. Local flow velocity increases occur, which are of a nature which generates shock waves in the area.

The present invention seeks to provide an improved combination of an aircraft and its fluid flow powerplant.

According to the present invention a combination comprises an aircraft, a fluid flow powerplant connected via link means to the underside of the wing structure of said aircraft and wherein the improvement comprises the provision of link connecting points on one side only of the longitudinal centreline of the powerplant, said one side being inboard with respect to the aircraft fuselage and an aerodynamically shaped box structure enclosing said links, said box structure including a wall which is inboard with respect to the aircraft fuselage and lies in a plane, which is at least substantially normal to the wing undersurface.

The invention will now be described, by way of example and with reference to the accompanying drawings in which.

Figure 1:
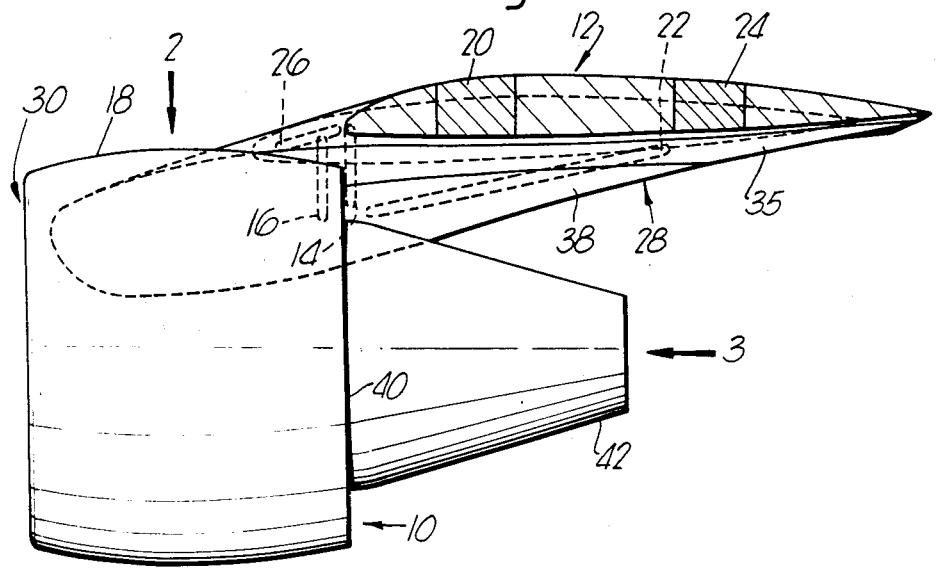
FIG. 1 is a part cross-sectional view on line 1—1 of FIG. 2.

Referring to FIG. 1. A ducted fan gas turbine engine 10 is supported from the wing 12 of an aircraft. The support is achieved as follows. A pair of links 14 and 16 support the weight of the ducted fan gas turbine engine 10 and resist torque loads. Each link 14 and 16 has one end pinned to locally strengthened structure which forms part of the fan cowl 18 and the other end pinned to a front main beam 20 of the wing 12. The pinned connections are only diagrammatically shown as centre marks since such joints are well known in the art.

A further elongate link 22 has one end pinned to the aforementioned structure which forms part of the fan cowl 18 and the other end pinned to a rear main beam 24 of the wing 12. The terms of art used to describe the link 22 is "drag link" and its function is to transmit the thrust loads of the engine 10 to the main beam 24 in the form of a tensible load, hence "drag" which results in the forward movement of the associated aircraft. Again, the connections of the link 22 are diagrammatic, such joining being well known.

A further, redundant link 26 is provided and connected between the front main beam 20 and the reinforced structure of the cowl 18. Its purpose is to at least temporarily transmit those loads normally transmitted by the link 22, in the event that the latter link fails.

Figure 2:
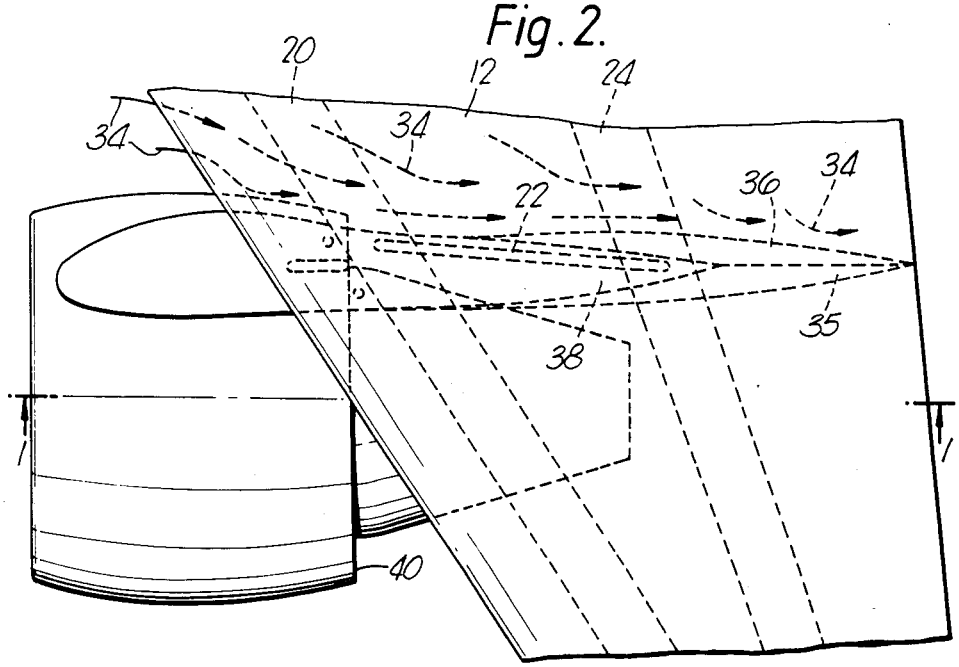
FIG. 2 is a view in the direction of arrow 2 in FIG. 1.

A sheet metal structure 28 encloses the links and provides an aerodynamically shaped box around which ambient air flows with minimum turbulence, during flight of the associated aircraft. The box structure 28 extends forwardly to a position adjacent the leading edge of the air intake 30 of the cowl 18. The extension is shown in dotted lines because the links 14,16,18,22 and 24 are all offset, behind a vertical plane which includes the centreline of the engine 10 as viewed in FIG. 1. This is more clearly seen in FIGS. 2 to 4 inclusive. As the box structure 28 encloses the links, if follows that the box structure 28 is also offset in a manner similar thereto.

Figure 3:
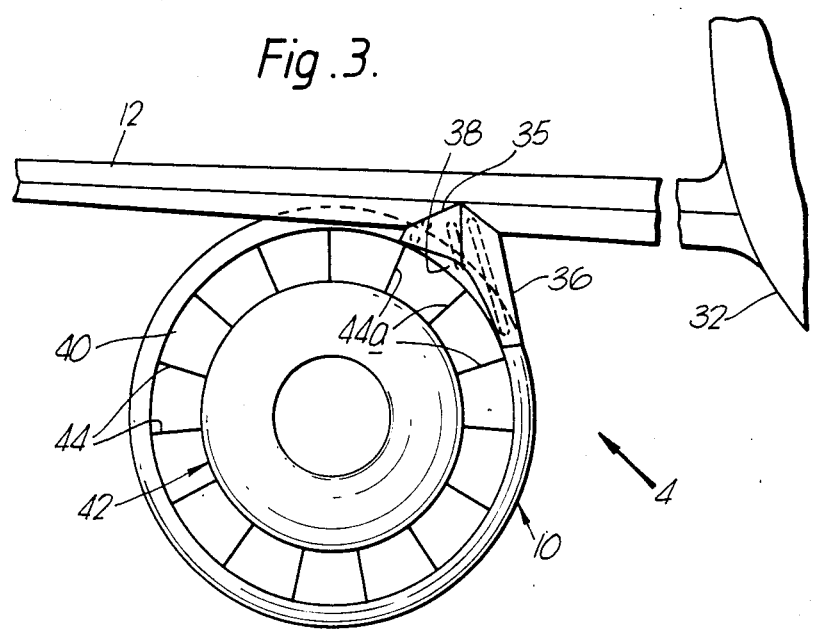
FIG. 3 is a view in the direction of arrow 3 in FIG. 1.
Figure 4:
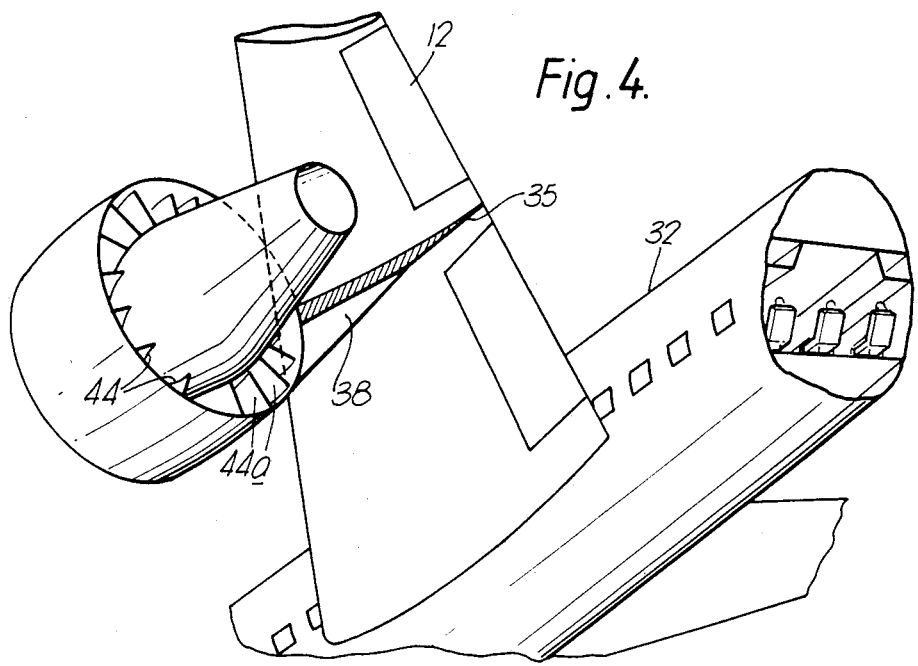
FIG. 4 is a pictorial part view in the general direction of arrow 4 in FIG. 3.

It is essential to the efficacy of the invention, that the offset is to that side of the engine 10 which is inboard with respect to the aircraft fuselage 32 (FIGS. 3 and 4). This is so that if that ambient air which on reaching the leading edge of the wing 12 and flows thereunder, starts to turn towards the wing tip as indicated by the arrows 34 (FIG. 2) rather than travel chordwise of the wing, the inboard side of the box structure 28 stops it piling up between the cowl 18 and the underside of the wing 12. The offset mounting thus obviates what has been an accepted through highly undesirable condition, which generated local high increases in flow velocity with accompanying shock waves.

Swept wing aircraft i.e. aircraft, the wings of which are angled in a rearward direction so that the wing tips are rearwards of the wing roots, always display the sideways turning airflow characteristic. Subsequently, the present invention has considerable efficacy if utilized on such aircraft.

The box structure 28 has an outboard sidewall 35 (FIGS. 1 to 4), an inboard sidewall 36 (FIGS. 2 to 4) and an underside 38 (FIGS. 1 to 4), the latter wall forming a propulsive fluid expansion surface which extends from the outer periphery of the fan nozzle 40, to a position intermediate the fan nozzle 40 and the downstream end of the box structure 28.

In the present example, the propulsive fluid is air which has been worked upon by the ducted fan of the ducted fan, gas turbine engine 10. The invention is not restricted to ducted fan gas turbine engines. A gas turbine engine of the kind that provides propulsive forces only from the exhausted products of combustion may be connected to the wing of an associated aircraft by the mouting described and claimed in this specification.

Referring now to FIG. 3, the cowl 18 of the ducted fan is of double walled construction and that part of the double wall to which the ends of the links 14,16,22 and 26 are connected, is reinforced relative to the remainder thereof. The cowl of a gas turbine engine would also be strengthened at a corresponding location, should such an engine by utilised and mounted in the manner described hereinbefore.

The core gas generator which drives the ducted fan is supported within a casing 42 via struts 44 and 44a from the fan cowl 18. Those struts 44a which are in the vicinity of the strengthened portion of cowl 18, and that portion of the casing 42 which encloses the core gas generator 42 and through which the inner ends of the struts 44a pass to connections (not shown) with the core gas generator proper, are all appropriately reinforced, so as to enable working loads to be passed therethrough via the reinforced portion of the cowl 18 and links 14,16,22 and 26, to the respective beams 20 and 24.

It is known, to support a ducted fan gas turbine engine about its top dead centre from an aircraft wing main beam, by connecting struts which extend radially from the core gas generator to the cowl of the fan. The known arrangement obviates the need to use a drag link which normally extends from the rearward main beam of the wing, across the fan duct, to connect with the core gas generator. Consequently, there is no need to extend the aerodynamic fairing across the fan duct to cover the drag link. Flow efficiency losses are thus obviated.

The present invention utilises a drag link 22. Its connection to the cowl 18 however, also avoids the need to extend the aerodynamic box structure 28 across the fan duct. It is thus seen that not only does the present invention obviate losses which are attributed to flow conditions between the cowl 18 and the underside of the wing 12, it also enables maintenance of the advantages gained by the known mounting arrangement.

"Handing" of an engine which incorporates the linkage arrangement of the present invention i.e. the construction of an engine such that in order to achieve the benefit from the present invention, it must be fitted to the wing on only one side of the aircraft fuselage rather than either side, can be avoided by providing mirror image link connecting points on both sides of the cowl 18 and on the respective wing beams on each side of the aircraft. However, handed blanking sheets of appropriate curvature would have to be provided to cover those parts of the cowl 18 which would normally be covered by the box structure 28. Further, handed box structures 28 would also have to be provided.

I claim:

1. In combination with an aircraft having a body including a wing having an underside, fluid flow powerplant means having an outer surface, link means connecting said powerplant means to the underside of said wing, the improvement comprising said powerplant means having a centerline and link means connecting points located to one side of said centerline, said one side being inboard with respect to said body, an aerodynamically shaped box structure enclosing said link means, said box structure including a wall which is inboard with respect to said body and lying in a plane which is at least substantially normal to said underside of said wing and substantially tangential to said outer surface of said powerplant means, said wall being located inboard with respect to all of said powerplant means mounted under said wing whereby the generation of shock waves between said wall and said body will be reduced.

2. The combination as claimed in claim 1 wherein the powerplant means is a ducted fan gas turbine engine.

3. The combination of claim 2 wherein said powerplant means includes a cowl and said cowl defines the outer surface of the ducted fan.

* * * * *